Patented Sept. 4, 1928.

1,683,159

UNITED STATES PATENT OFFICE.

MAX BUCHNER, OF HANOVER-KLEEFELD, GERMANY, ASSIGNOR TO ALBERT FRITZ MEYERHOFER, OF ZURICH, SWITZERLAND.

PROCESS FOR THE PRODUCTION OF SOLUBLE SALTS OF ORGANIC COMPOUNDS POSSESSING ACID CHARACTER.

No Drawing. Application filed December 22, 1925, Serial No. 77,129, and in Germany January 16, 1925.

This invention relates to the production of soluble salts of organic compounds possessing acid character of any kind, especially of the sebacic acids. The new process consists in producing first insoluble compounds of these organic substances and in converting the same by means of fluorides, such a base being preferably selected for the formation of the insoluble organic compounds which is also capable of forming an insoluble fluoride.

As fluorides for the conversion of the insoluble compounds of the organic substances which have at first been produced the simple metal fluorine compounds as well as the salts of the complex hydrofluoric acids are to be taken into consideration. By selecting suitable liquids as dissolving means one of the reaction products will be obtained from the reaction directly in an insoluble state, so that by filtering or lixiviating or the like a separation of the reaction products is possible. If acid organic combinations, the esters of the same or the like are at disposal, they are first converted with bases or salts of such a metal that an insoluble compound is produced. From this combination the soluble organic compound is produced with the aid of a fluoride, whilst the metal fluoride which is separated is converted into complex metal fluorides by means of the fluoride of a complex-forming element in presence of salt and eventually by the aid of a contact acid, said complex metal fluoride liberating, when heated, on the one hand the desired metal fluoride and on the other hand the fluorine compound of the complex element.

This invention is of special importance for the production of soaps. Sebacic acid soaps have been produced hitherto by converting the sebacic acids, or the esters (glycerides) of the same, by means of caustic alkalis. The condition for the carrying through of such a process is the existence of free bases or salts of acids, which can be easily driven out by the sebacic acids. For the treatment of the sebacic acids lime is also used, so that at first lime soaps are produced which are then converted with soda. It has already been proposed to treat the glycerides of the sebacic acids directly with the lime in order to obtain lime soaps.

According to my invention insoluble soaps are produced from the sebacic acids or from the glycerides of the same with the aid of hydroxides of calcium, magnesium, lead, zinc, or other elements which form insoluble soaps with sebacic acids. Subsequently the latter were reacted upon by an alkali metal fluoride.

Instead of the hydroxides, carbonates of the metals mentioned may be used for the formation of the insoluble compounds of the organic substances, for instance for the formation of the insoluble soaps. If mixtures of metal compounds and organic substances are obtained, as is the case in the treatment of the glycerides, in which case, besides an insoluble soap, glycerine is obtained, the mixtures are separated according to the commonly used methods, e. g. either by way of distillation or on the basis of their differences of solubility by extracting with suitable solvents.

From the fluorine compounds obtained from the treatment with fluorides, the fluoride of the metal, which is bound to the organic acid substance, is formed.

As one will work generally with the simple metal fluorine compounds, the fluoride obtained in the last instance will be used to form, with the aid of the fluorine compound of a complex element and of a salt preferably in presence of contact acids, the complex salt of the corresponding metal. This complex salt is decomposed by heating and there is obtained, on the one hand, the fluoride which is necessary for the treatment of the insoluble compounds of the organic acids and, on the other hand, the fluorine compound of the complex element which is also returned into the process to form the desired intermediate product, e. g. the complex hydrofluoric salt.

The proceeding is illustrated by the following formulæ:

1.—$2R.COOH + Me(OH)_2 = Me(R.COO)_2 + 2H_2O$

2.—$Me(R.COO)_2 + 2NaF = 2R.COONa + MeF_2$

3.—$MeF_2 + SiF_4 + 2NaCl(acid) = Na_2SiF_6 + MeCl_2$

4.—$Na_2SiF_6 = heat = 2NaF + SiF_4$ $2C_{17}H_{33}COOH + Ca(OH)_2 = Ca(C_{17}H_{33}COO)_2 + 2H_2O$ $Ca(C_{17}H_{33}COO)_2 + 2NaF = 2C_{17}H_{33}COONa + CaF_2$ $CaF_2 + SiF_4 + 2NaCl(acid) = Na_2SiF_6 + CaCl_2$ $Na_2SiF_6 + heat = 2NaF + SiF_4$ The metal combinations necessary for the production of the insoluble compounds of the organic substances can also be carried through the process in a cycle. As example the treatment of the organic acids by calcium carbonate is represented in the following formulæ. The insoluble lime compound is converted with an alkali-metal fluoride. The calcium fluoride produced in this case is converted, by the use of the fluoride of a complex element and alkali metal chloride, into complex alkali metal fluoride. If the latter is heated, it supplies the alkali metal fluoride and the fluoride of the complex element, which are both required in the preceding phases of the process. The calcium chloride, which has been produced besides the formation of the complex hydro-fluoric alkali metal salt, is then converted by means of carbonic acid and ammonia, into carbonate of lime, which is used again for the production of the insoluble compound of the organic substance which is necessary at the beginning of the process. The proceeding is represented by the following formulæ:

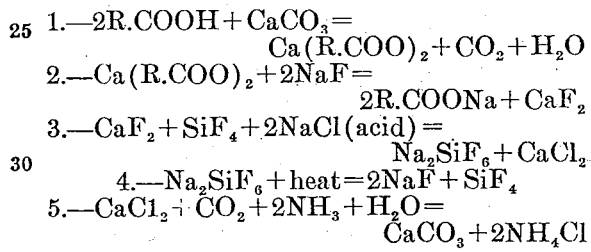

Under certain conditions it is necessary to liberate from the existing organic substances the compounds possessing acidic character. With this object in view hydrofluoric acids are used as much as possible. If one works with complex hydrofluoric acids, they may be used in the finished state as well as in the form of their constituents or in the form of their building-up compounds, as metal fluorides, silicon fluoride and acid. One proceeds preferably in such a manner, that in the same process, or eventually in a separate cyclic process which follows without interference upon the above described process, the hydrofluoric acid is recuperated. An example by formulæ is given hereafter, in which, besides the recuperation of a complex hydro-fluoric acid, soda is obtained at the same time.

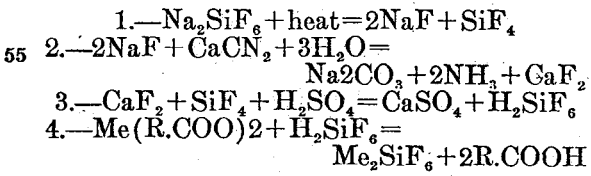

From the complex hydrofluoric acid metal compound obtained according to the equation 4 the sodium silico fluoride mentioned at the beginning of the example, can be easily recuperated. If the metal silico fluoride is insoluble, it is decomposed by heating, and from the remaining fluoride, the separated silicon fluoride and sodium chloride, the sodium silico fluoride is built up. If it is a soluble silico fluoride, the sodium silico fluoride can be recuperated directly by sodium chloride.

The working phase last described according to equation 2 yields ammonia besides the soda. This can be used again, together with the carbonic acid, to reproduce in the above-stated example calcium carbonate from the calcium chloride, e. g. the compound which is designed to produce first the insoluble compound from the organic substances.

If for carrying out the process the silico fluoride is used, the metal fluoride separated in the course of the process can be reacted upon by means of silicic acid, salt and eventually fluorspar and a decomposing acid, in order to re-form the silico fluoride, the desired silicon fluoride being produced, so to say intermediarily.

If the process is carried out by means of other complex fluorides, the oxide or any other suitable compound of the complex element is utilized for the building up of the same, instead of the silicic acid.

If one carries out the work with other complex hydro-fluoric compounds, boron fluoride is added instead of the silico fluoride mentioned in the example by formulæ. The complex hydro-fluoric compounds can be used also immediately for the reactions instead of simple fluorides.

The several reactions may be carried out at increased temperature f. i. at 40–100° C. and higher eventually under pressure.

One will preferably work with small quantities of solvents, if such are necessary. The reaction substances are preferably utilized in the unsolved state.

It is rather surprising that the metal fluorides produced by the reaction, are obtained in such a form that they easily deposit and are easy to filter.

Hitherto organic compounds, as soaps, have been produced by first preparing a free organic acid and reacting therewith upon hydroxides or carbonates. It was always necessary to prepare the latter compounds by difficult operations. Therefore, the process of producing organic compounds was of small economy.

By the present invention the desired organic compounds can be produced from any cheap products, as cheap salts, by-products of other processes etc. The process is characterized by the fact that the repreparation of the required reagents is possible, thus guaranteeing highest economy. Further, the invention has the advantage that by-products of high value can be, if desired, obtained. And, finally, that all products prepared by the new process are of great purity.

Claims:

1. The method of making soluble salts of organic substances having an acid character, which comprises first forming an insoluble metal compound of the substance, and reacting upon the same with a fluoride whose base forms a soluble organic compound therewith.

2. The method of making soluble salts of organic substances having an acid character, which comprises first forming an insoluble metal compound of the organic substance whose metal produces an insoluble fluoride, and reacting on the insoluble product with a fluoride whose base will replace said metal to form a soluble organic salt.

3. The method of making soluble salts of organic substances having acid character, which comprises forming an insoluble metal compound of such substance by double reaction, reacting on said insoluble metal compound with a fluoride thereby exchanging the bases of the compound and fluoride, reforming the first fluoride from the resulting metal fluoride and returning the re-formed fluoride into the cycle of operations.

4. The method of making soluble salts of organic compounds having an acid character, which comprises reacting upon a metal free organic compound with a metal compound capable of forming an insoluble organic compound and a difficultly soluble fluorid, reacting upon the difficultly soluble organic compound with a fluorid whose base reacts to form a soluble organic compound and an insoluble metal fluorid, reacting upon the insoluble metal fluorid with a complex fluorid, forming fluorid in the presence of a salt of said base and a contact acid to form a complex metal fluorid and heating the resulting complex metal fluorid to decompose it into fluorine compounds, and returning them into the cycle of operations.

5. The method of making soluble salts of organic compounds of acid character, which comprises reacting on such a metal-free organic compound with a metal compound capable of forming an insoluble organic metal compound and a difficultly soluble fluoride with hydrofluoric acid; reacting upon the insoluble organic compound with a fluorid whose base forms therewith an insoluble organic salt and a difficultly soluble metal fluoride; reacting upon the latter fluoride with an oxid capable of forming a complex fluoride, a salt whose base is to combine to form the soluble organic salt in the presence of a contact acid to form a complex fluoride, heating the complex fluorid to separate it into two fluorides for return into the cycle of operations.

6. The method of making soluble salts of organic compounds having an acid character, which comprises first forming an insoluble metal compound of the substance, reacting upon the latter with a complex hydrofluoric acid and forming the free organic compound having an acid character and a complex fluoride of the metal of the insoluble compound, reacting on the free organic compound with a compound the desired base of which is to be combined therewith, and reforming complex hydrofluoric acid from said complex metal fluoride for return into the cycle of operations.

7. The method of making soluble salts of organic compounds having an acid character, which comprises decomposing an insoluble metal salt of such a compound by the constituents forming a complex fluoric acid to form the organic compound and precipitating a complex metal fluoride, decomposing the complex fluoride to form a metal compound, and reacting on said organic compound with said metal compound to form a soluble salt of such organic compound.

8. The method of making soluble alkali metal salts of organic compounds having an acid character which comprises reacting upon such metal-free organic compound with calcium carbonate, reacting upon the insoluble resulting calcium salt with an alkali metal fluoride to form the soluble organic salt and calcium fluoride, reacting on the calcium fluoride with the fluoride of a complex fluoride-forming element and alkali metal chloride to form a complex alkali metal fluoride, reacting on the calcium chloride with carbonic acid and ammonia to re-form calcium carbonate for return into the cycle of operations.

9. The method of making soluble salts of organic compounds of acid character, which comprises reacting upon an insoluble metal salt of such a compound with a soluble complex fluoride to form the soluble organic salt and precipitate a complex metal fluoride, heating the latter fluoride to split it into a simple fluoride and a gaseous fluoride, reacting on the simple fluoride with a metal compound to form a difficultly soluble fluoride, and re-forming the soluble complex fluoride from the difficultly soluble fluoride by reacting thereon with said gaseous fluoride and a salt containing the base of the soluble complex fluoride in the presence of a contact acid.

In testimony that I claim the foregoing as my invention, I have signed my name.

Dr. MAX BUCHNER.